United States Patent [19]
Wright

[11] 3,935,929
[45] Feb. 3, 1976

[54] VEHICLE WHEEL BRAKES
[75] Inventor: Andrew Charles Walden Wright, Birmingham, England
[73] Assignee: Girling Limited, Birmingham, England
[22] Filed: Aug. 28, 1974
[21] Appl. No.: 501,294

[30] Foreign Application Priority Data
Aug. 29, 1973 United Kingdom............... 40701/73

[52] U.S. Cl............................... 188/331; 188/341
[51] Int. Cl.² ........................................ F16D 51/48
[58] Field of Search .......... 188/331, 332, 333, 268, 188/325, 341; 403/132, 133

[56] References Cited
UNITED STATES PATENTS

| | | | |
|---|---|---|---|
| 2,918,146 | 12/1959 | Cornillaud ............... | 188/79.55 C X |
| 3,412,869 | 11/1968 | Wallace et al................. | 188/268 X |
| 3,744,595 | 7/1973 | Adams........................... | 188/331 X |
| 3,750,853 | 8/1973 | Farr............................... | 188/71.8 X |

FOREIGN PATENTS OR APPLICATIONS
1,484,045  5/1967  France............................... 188/325

Primary Examiner—George E. A. Halvosa
Attorney, Agent, or Firm—Schrivener Parker Scrivener and Clarke

[57] ABSTRACT

An abutment assembly for an internal shoe drum brake, particularly a vehicle wheel brake, comprising opposed abutment members for engagement with respective brake shoes and an arrangement for transmitting forces between the abutment members. The arrangement comprises a deformable member contained within a recess in one abutment member and sandwiched between the abutment member and a piston in force transmitting relation with the other abutment member. The deformable member has different areas of engagement with the piston and the one abutment member so that only a part of the thrust applied to one abutment member is transmitted to the other abutment member.

4 Claims, 1 Drawing Figure

← DIRECTION OF FORWARD ROTATION

U.S. Patent  February 3, 1976  3,935,929
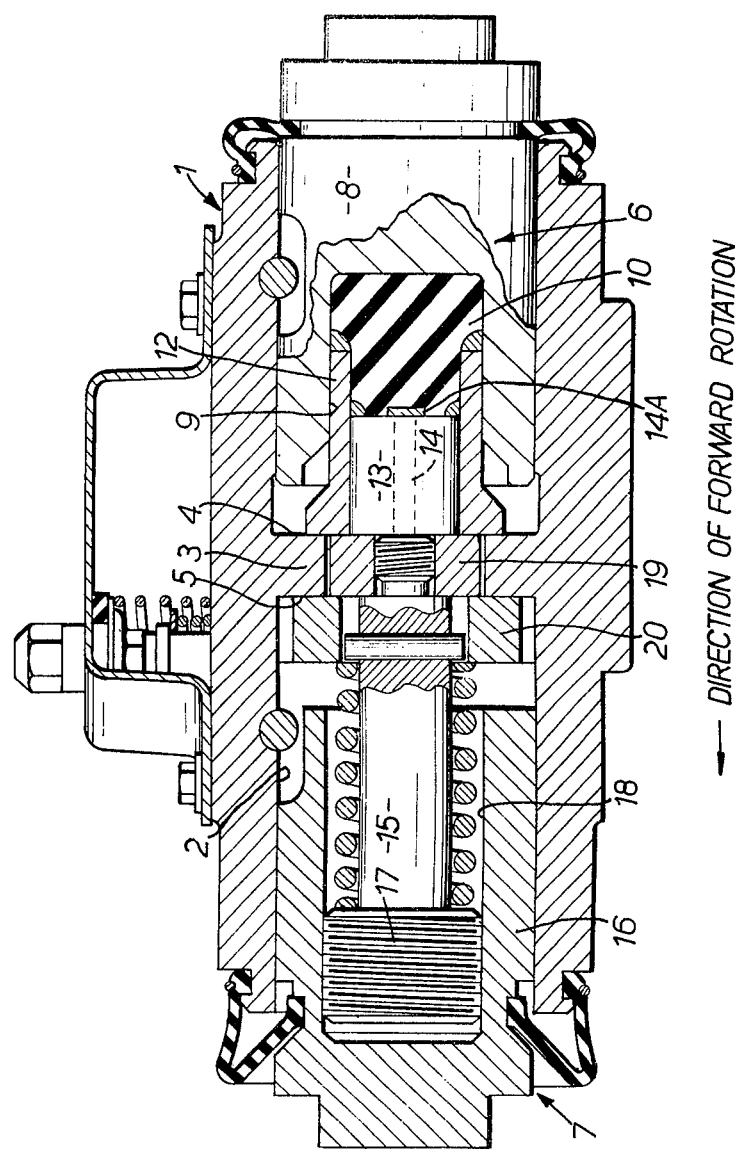

VEHICLE WHEEL BRAKES

This invention relates to internal shoe drum brakes of the two leading shoe type.

The abutment load on the primary shoe if used directly to actuate the other shoe, may result in the secondary shoe being applied with greater pressure than is desirable, because of the servo-effect created by the rotation of the wheel.

In accordance with the invention, there is provided an abutment assembly for an internal shoe drum brake, comprising a pair of tappet assemblies having opposed first and second abutment members for engagement with the ends of respective brake shoes, and force-transmitting means for transmitting forces between the abutment members, said force-transmitting means including deformable means contained within a recess in the first abutment member and engaging on one side the first abutment member and on the other side a piston member in force transmitting relation with the second abutment member, the deformable means having different areas of engagement with the piston and the first abutment member so that only a part of the thrust applied to one abutment member is transmitted to the other abutment member.

By arranging the chamber within the first abutment member, rather than axially adjacent the member, more space is left within any given support structure, such as a cylinder body over which the abutment member may be externally supported. Adequate support for the member is, of course, important because of the substantial loads which it has to transmit and the present arrangement permits adequate support without unduly increasing the overall length of the assembly.

An abutment assembly in accordance with the invention for an internal shoe vehicle drum brake will now be described by way of example, with reference to the accompanying drawing which shows an axial cross-section of the abutment assembly.

The abutment assembly is, in use, fastened to the brake back plate (not shown) between adjacent ends of a pair of brake shoes (not shown) of the drum brake, a double-ended hydraulic actuator (not shown) being positioned between the other two ends of the shoes.

The abutment assembly comprises a housing 1 having a bore 2 and an internal annular shoulder 3 intermediate its ends having abutment surfaces 4 and 5. A right-hand tappet assembly 6 and a left hand tappet assembly 7 are housed within the bore 2 on either side of the shoulder 3.

The right hand tappet assembly 6 comprises an abutment member 8 slidable within the bore and having an outer end which in use abuts an end of one of the brake shoes. At its inner end the abutment member 8 has a recess in the form of a blind bore 9 within which an elastically deformable member 10 is contained. A sleeve 12 is arranged so that its inner end abuts the surface 4 of internal shoulder 3 and its outer end extends as a sliding fit within the blind bore 9. Slidable within the sleeve 12 is a piston 13 having a hole 14 therethrough to release the air which would otherwise be trapped between the said piston and the member 10 during assembly. During operation the hole is covered by a plate 14A. It will be seen from the drawing that the piston 13, sleeve 12 and abutment member 9 define a chamber which is completetly filled by the elastically deformable member 10, which has an end portion of one diameter and another end portion of larger diameter, the reduction in cross section being effected progressively and continuously and not by a single abrupt step.

The left-hand tappet assembly 7 comprises an abutment member 16 slidable in the bore 2, a spindle 15 having a threaded outer end portion 17 received in a correspondingly threaded blind bore 18 in the member 16. The spindle 15 co-operates with a gear 20 of an adjuster mechanism and carries at its inner end a collar 19 which abuts the inner end of sleeve 12. The gear 20 and spindle 15 are keyed together by a pin 15a so that they can move relatively axially of the adjuster.

Operation of the abutment assembly will now be described. When the brake drum is rotating in the forward direction (clockwise as seen in the drawing i.e. from right to left) and the brake is applied, an abutment load is applied to the abutment member 8 of the right hand tappet assembly by the trailing edge of the adjacent shoe. This load urges the abutment member 8 to the left as seen in the drawing and forces the deformable member 10 against the outer end of the sleeve 12 and into the sleeve, increasing the hydrostatic pressure of the member and pushing the piston 13, the collar 19, the spindle 15 and the abutment member 16 to the left.

The force transmitted to the abutment member 16 is less than that applied to the abutment member 8 because of the force-reduction effect of squeezing the deformable member 10 into the sleeve 12, which is prevented from moving due to its abutment with the shoulder 3. When the brake is released the assembly returns to the condition shown in the drawing under the action of shoe return springs (not shown).

When the drum is rotating in the reverse direction and the brake is applied, the abutment force is transmitted through the abutment member 16 from its adjacent shoe and through the spindle 15 to the collar 19 which engages a shoulder on the spindle. From the collar 19 the force is transmitted to the whole cross sectional area of the piston 13 and sleeve 12, which moves from the shoulder 3, and to the abutment member 8. Thus the full abutment force is transmitted from the left hand shoe to the right hand shoe to give a true duo-servo effect.

Although the above-described abutment assembly permits force reduction in only one direction, it is possible to provide an assembly in which the force is reduced in each direction. This may be achieved by providing two deformable members at least one of which is housed within an abutment member.

What I claim is:

1. An abutment assembly for an internal shoe drum brake, comprising a pair of tappet assemblies having opposed first and second abutment members for engagement with the ends of respective brake shoes, means defining a recess in said first abutment member, and force-transmitting means for transmitting forces between the abutment members, said force transmitting means including a sleeve member slideably received in said recess, a piston member slideably rceived in said sleeve member, one of said piston and sleeve members being in force transmitting relation with the second abutment member, and deformable means of elastomeric material contained within said recess in said first abutment member and engaging on one side the first abutment member, a part of the other side of the deformable means extending into said sleeve member and into engagement with said piston member therein, and the other part of said other side being in engagement with said sleeve member, the areas of engagement of the respective parts with said sleeve member and with said piston member being different from the area of the first side of the deformable means in engagement with said first abutment member, a fixed member engageable by one of said piston and sleeve members to retain said one of said piston and sleeve members stationary when a force is applied to said first abutment member to move it and the other of said piston and sleeve members relative to the one of said members and transmit to said second abutment member through said deformable means only a part of the thrust applied to said first abutment member.

2. The abutment assembly according to claim 1 wherein said fixed member is engageable by said sleeve member to retain it stationary while said first abutment member and said piston member are moved by a thrust applied to said first abutment member relative to said sleeve member.

3. An abutment asembly according to claim 1, wherein the recess is in the form of a blind bore formed in the first abutment member, and including a sleeve slidably received in the bore, said piston being slidable in said sleeve and said deformable means extending into said sleeve to that the difference in the areas of engagement of said deformable means with said first abutment member and with said piston if the cross-sectional area of said sleeve.

4. An abutment assembly according to claim 3, wherein the reduction in cross-sectional area between said recess and the interior of said sleeve is progressive and continuous.

* * * * *